E. R. Stilwell,
Feed Water Purifier,
Nº 66,998. Patented July 23, 1867.
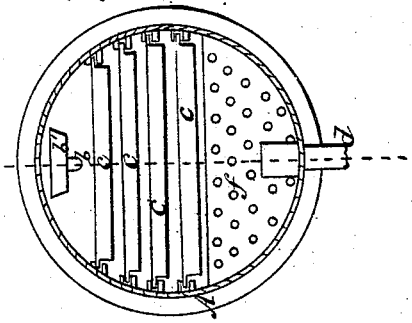
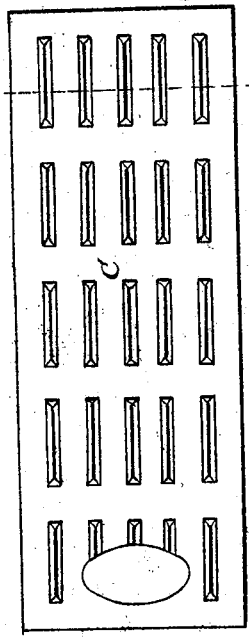
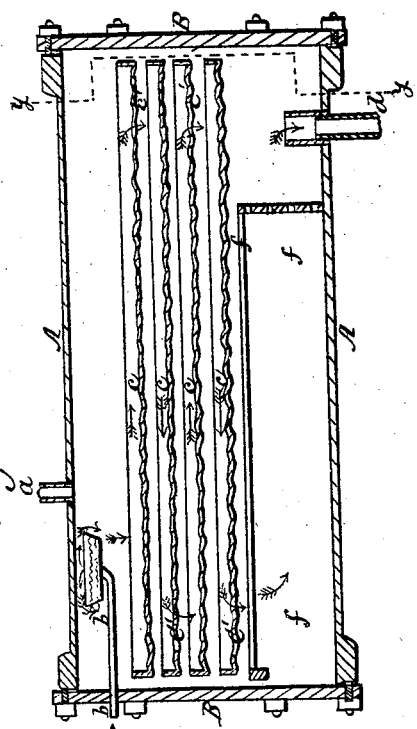
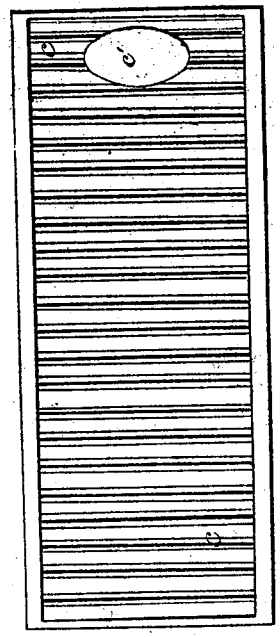
Witnesses.
R. J. Campbell
Edw. Schafer
Inventor:
E. R. Stilwell

United States Patent Office.

EDWIN R. STILWELL, OF DAYTON, OHIO.

*Letters Patent No. 66,998, dated July 23, 1867.*

IMPROVEMENT IN FEED-WATER HEATERS.

*The Schedule referred to in these Letters Patent and making part of the same.*

TO WHOM IT MAY CONCERN:

Be it known that I, EDWIN R. STILWELL, of Dayton, in the county of Montgomery, and State of Ohio, have invented an "Apparatus for Purifying Water for Steam-Boilers;" and I do hereby declare the following to be a full, clear, and exact description thereof, reference being had to the accompanying drawings, making part of this specification, in which—

Figure 1 is a longitudinal section, taken centrally through the purifier.

Figure 2 is a cross-section through the same, taken at the point $y\ y$ in fig. 1.

Figure 3 is a view of one of the shelves over which the water flows.

Figure 4 is a view of a cover which may be used upon each shelf.

Similar letters of reference indicate corresponding parts in the several figures.

This invention relates to a novel apparatus which is designed for purifying water by the action of live steam upon it, so as to free it from sediment and the salts which may be held in solution before it enters the boiler. The object of my invention is to effect a separation of mineral matters and other substances in water which is to be used in steam-boilers, by the introduction of the water within a chamber which is in direct communication with the steam-chamber of the boiler, and which is provided with a series of shelves, arranged and so constructed as to cause the water to flow horizontally over them in a thin sheet or stream, and to be subjected thoroughly to the action of the live steam, said chamber being also provided with a filtering medium, which is so arranged that after the water has circulated over the shelves, and has been deprived of its mineral matters, it will then be filtered and purified of its other objectionable substances, so that, before entering the boiler, the water will be practically pure, as will be hereinafter described.

To enable others skilled in the art to understand my invention, I will describe its construction and operation.

In the accompanying drawing, A represents a strong vessel, which may be made of the cylindrical form shown in the drawings, or of any other suitable form, and which has its ends closed steam-tight by means of the heads B B shown in fig. 1. This vessel may be connected to the lower part of the boiler or mud-well thereof by means of a pipe connected at $d$ to the escape-opening for the pure water, and it may be connected to the upper portion of the boiler by means of a pipe, $a$, so as to receive live steam direct from the boiler. The vessel A should be arranged in or nearly in a horizontal position and supplied with water through the feed pipe $b$, having a shallow vessel or hood, $b'$, upon its inner end, over the sides or against the bottom of which the water flows in a thin sheet, as represented in figs. 1 and 2. Directly beneath the vessel or hood $b'$ is a shelf or pan, $c$, having a corrugated bottom, which receives the water flowing from said vessel and conducts it toward the opposite end of the vessel A, where it flows through a hole, $c'$, through the bottom of the pan or shelf $c$, and falls upon a corresponding shelf, $c$, placed beneath it. A great number of these shallow corrugated bottom shelves or pans may be arranged one below the other, and constructed with holes $c'$ through their ends, so that the water will flow over an extensive surface and be thoroughly exposed to the action of the steam contained in the vessel A before it flows upon the filtering substance contained in a chamber, $f$, which is at the bottom of this vessel. The filtering medium may consist of straw or other suitable material, confined in place by means of the rack or grating and the perforated end piece, as shown in fig. 1. After percolating through the filterer the water then flows over the internal elevated portion of the pipe $d$ and escapes through this pipe into the boiler. The shelves $c\ c$ are applied within the cylinder A, so that they will slide freely in and out, and may be readily removed, when it is desired to clean them, by removing one of the heads of said cylinder. In figs. 4 and 5 I have represented a cover or lid which may be applied to each one of the shelves $c$ for the purpose of preventing the water from being thrown over the sides of the shelves. The depressions which are made in these shelves, $c$, are used for exposing a large amount of heating surface to the water flowing over the shelves.

I am aware that a patent was granted to A. M. Granger, January 26, 1864, for a feed-water heater for steam-boilers, wherein he describes an arrangement of basins within a vertical vessel which is in direct communication with the steam-boiler, over or through which basins the feed-water flows, and is exposed in the form of drops or small streams to the action of steam, which, it is alleged, effects a speedy purification of the water. I am also aware that George Hosecoster and Isaac Stephens received a patent September 18, 1866, for a feed-water heater and purifier, in which steam is employed as the means of purification. I do not make claim to the contrivances mentioned in said Letters Patent, and believe that my invention possesses novelty and advantages over such contrivances. In practice, the vessel shown in figs. 1 and 2, and lettered $b'$, may be inverted, so as to form a cap or hood over the pipe $b$, thereby concentrating the water and delivering the same upon the pan $c$, directly beneath, instead of spreading the water, as stated.

What I claim as new, and desire to secure by Letters Patent, is—

1. The feed-water purifier, having its filtering-chamber $f$ and its cap or hood $b'$ arranged in the relation to corrugated pans or corrugated plates $c$, and to inlet and outlet pipes $a\ d$, substantially as and for the purpose set forth.

2. The filtering-chamber, constructed and arranged as shown and described, within the horizontal chamber A B, which has its outlet $d$ arranged as shown.

EDWIN R. STILWELL.

Witnesses:
 E. S. YOUNG,
 G. NELSON BIERCE.